March 31, 1925.

L. LORENZ 1,531,797

WHIRLING MACHINE FOR USE IN PREPARING LITHOGRAPHIC PLATES

Filed Feb. 13, 1924

INVENTOR
Louis Lorenz
BY
ATTORNEY

Patented Mar. 31, 1925.

1,531,797

UNITED STATES PATENT OFFICE.

LOUIS LORENZ, OF NEW YORK, N. Y.

WHIRLING MACHINE FOR USE IN PREPARING LITHOGRAPHIC PLATES.

Application filed February 13, 1924. Serial No. 692,459.

*To all whom it may concern:*

Be it known that I, LOUIS LORENZ, citizen of the United States, residing at New York city, in the county of New York and State of New York, have invented certain new and useful Improvements in Whirling Machines for Use in Preparing Lithographic Plates, of which the following is a specification.

This invention relates to a machine for use in preparing the zinc lithographic plates employed in connection with offset printing presses, these plates requiring to be first washed, then covered with a sensitizing coating, and then baked or heated to dry said coating.

The present invention has for an object the provision of a novel and simple machine which will facilitate the preparation of these plates, enabling all the operations to be performed without transporting the plate from one place to another, which will be noiseless in operation, and avoid chance of marking or streaking the plates.

For further comprehension of the invention, and of the objects and advantages thereof, reference will be had to the following description and accompanying drawing, and to the appended claims in which the various novel features of the invention are more particularly set forth.

Figure 1:
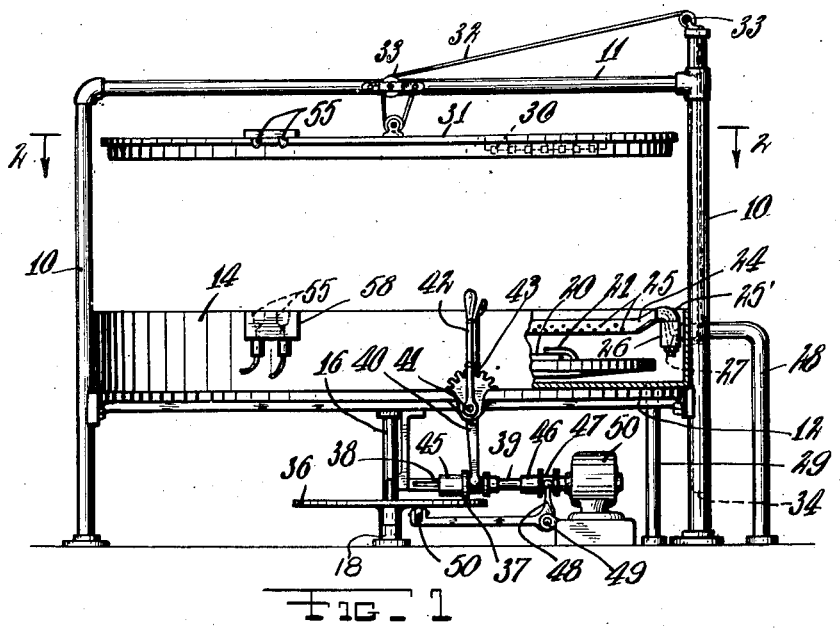

Fig. 1 of the drawing is a side view, with parts broken away, of my improved machine.

Figure 2:
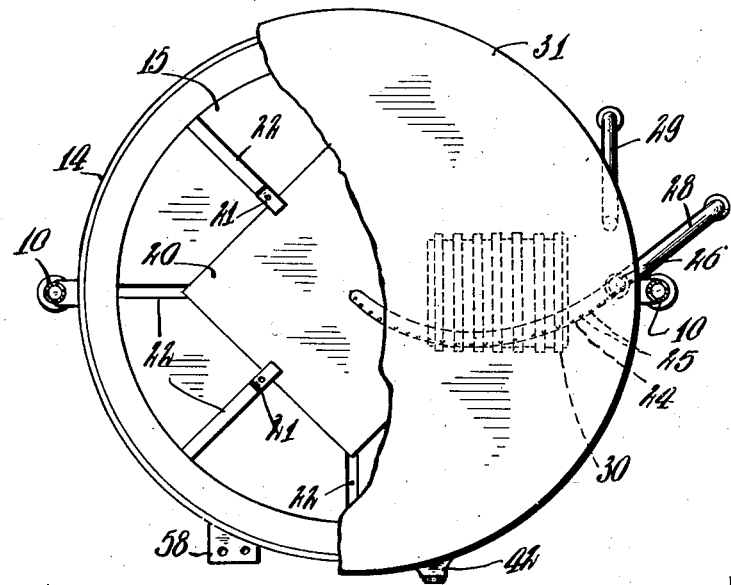

Fig. 2 is a horizontal sectional view taken on the line 2—2 of Fig. 1, and with additional parts broken away.

As here embodied my improved machine comprises a frame consisting of the hollow side posts 10 which are united by the upper and lower horizontal bars 11 and 12 respectively. The lower crossbar 12 supports a shallow pan or receptacle 14 of circular outline. Located in this pan, concentrically thereof, is a horizontal disk or table, 15 of nearly equal diameter with the pan, this table being fixed on the upper end of a vertical shaft 16 supported at its upper end in, and extending through, the crossbar 12, the lower end of this shaft being seated in a suitable socket bearing 18.

The table 15 is adapted to have placed thereon the plate to be treated, the latter being indicated at 20, and being adapted to be clamped upon the table by means of the clamps 21 carried in radial grooves 22 in the top face of the table. Water is directed upon the plate, while the latter revolves, with the table, from a pipe 24 having suitable rows of apertures 25 therein, this pipe being connected to a hollow valve plug 25' seated in a casing 26 and having a passage 27 therethrough which is brought into registry with the intake port of the casing 26 when the pipe is swung to a position projecting radially over the table, swinging of the pipe toward the side of the pan acting to close the valve, it being obvious that the valve plug 25' is rotated as the pipe is swung. A suitable feed pipe 28 connects to the valve casing 26, and discharge pipe 29 is connected to the bottom of the pan.

To bake the plate 20, after washing and sensitizing thereof, I provide an electrical heater 30 which is mounted in a cover 31 hung from the upper crossbar 11 and which is adapted to be moved vertically to sit on the top of the pan 14, or be raised clear of the pan. As here shown the cover is suspended from a cord or cable 32 which passes around suitable pulleys 33 and down one of the posts 10 to connect to a counter-weight 34 free in said post.

The shaft 16 is adapted to be rotated by a variable speed friction drive comprising a large disk 36 mounted on the said shaft and engaged by a small disk 37 feathered as at 38 on a horizontal shaft 39 and adapted to be moved by a lever arm 40 across the face of the disk, the lever arm being here shown as fixed to the other end of said shaft and being provided with a suitable variable locking device 43 of ordinary construction.

To increase the range of speed of rotation of the disk 36 and table 15 I have shown an elongated element 45 of smaller diameter fixed to the drive disk 37 and which may be brought into engagement with the driven disk 36, when the disk 37 is shifted beyond the circumference of the driven disk. When the disk 37 is thus shifted it bears against a collar 46 free on the shaft and having a groove 47 in its periphery engaged by one end of a bell crank lever 48 which is fulcrumed as at 49 on the pedestal of an electric motor 50 which drives shaft 39, this lever having a roller 51 on its opposite end adapted to engage under the driven disk 36 and lift the latter to cause it to be engaged with the member 45. It will be understood of course that the collar 46 is engaged by the hub element of the disk 37 to cause movement of the bell crank lever 48 only when the said disk 37 is beyond the circumference of the driven disk, so as to prevent locking of the disk 37 in its outer position, by engagement with the edge of the driven disk 36. To supply electric current to the heater 30 I may mount on the cover 31 a pair of insulated contact pins 55 suitably connected to the heater and which are adapted to engage contact elements 56 on the pan to which the feed wires lead, these contacts having their tips located in sockets 57 in an insulating block 58.

In the use of my improved machine, the plate to be prepared is placed on the table 15 and the water from the pipe 24 directed thereon, the motor 50 being started to cause the table to revolve. After the plate has been cleaned, it is allowed to dry and the sensitizing coat is placed thereon; and then the cover 31 is moved downward and the current thereby turned on the heater 30 to properly bake the plate. With the use of my improved machine all the operations of cleaning, drying, sensitizing and baking are done with one handling of the plate, finishing the plate even and clean and avoiding streaks or marks on the plate surfaces.

While I have illustrated and described a preferred embodiment of my invention it is to be understood that I do not limit myself to the precise construction herein shown, and that various changes and modifications might be made therein without departing from the spirit and scope of the invention as defined in the appended claims.

Having thus described my invention what I claim as new and desire to protect by Letters Patent of the United States is as follows:—

1. A machine of the type described comprising a pan, a rotary table therein, a liquid feed pipe positioned in said pan to extend above said rotary table, a cover for said pan, and an electric heating element carried by said cover.

2. A machine of the type described comprising a pan, a rotary table therein, a liquid feed pipe positioned in said pan to extend above said rotary table, a cover for said pan, and an electric heating element carried by said cover, and means suspending said cover for vertical movement to and from said pan.

3. A machine of the type described comprising a pan, a rotary table therein, a liquid feed pipe positioned in said pan to extend above said rotary table, a cover for said pan, an electric heating element carried by said cover, a pair of contact elements carried by said cover for controlling the circuit to said heating element, and a second pair of contact elements mounted on the said pan to be engaged by the first named pair to close the circuit through the said heating element when the cover is positioned upon the pan.

4. A machine of the type described comprising a pan, a rotary table therein, a liquid feed pipe positioned in said pan to extend above said rotary table, a cover for said pan, and an electric heating element carried by said cover, and means whereby the circuit through said heating element is closed by movement of said cover in position on said pan.

In testimony whereof I affix my signature.

LOUIS LORENZ.